United States Patent
Bannai et al.

(10) Patent No.: US 9,772,809 B2
(45) Date of Patent: Sep. 26, 2017

(54) PRINTED MATTER DELIVERY SYSTEM, IMAGE FORMING APPARATUS, AND PRINTED MATTER DELIVERY APPARATUS

(71) Applicants: Kazunori Bannai, Kanagawa (JP); Yasuhisa Ehara, Kanagawa (JP); Katsunori Shoji, Kanagawa (JP); Daisuke Maeda, Kanagawa (JP); Yusuke Funayama, Kanagawa (JP); Keiichi Serizawa, Kanagawa (JP); Kazuhiro Takabayashi, Tokyo (JP); Seiichi Handa, Tokyo (JP)

(72) Inventors: Kazunori Bannai, Kanagawa (JP); Yasuhisa Ehara, Kanagawa (JP); Katsunori Shoji, Kanagawa (JP); Daisuke Maeda, Kanagawa (JP); Yusuke Funayama, Kanagawa (JP); Keiichi Serizawa, Kanagawa (JP); Kazuhiro Takabayashi, Tokyo (JP); Seiichi Handa, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/071,142

(22) Filed: Mar. 15, 2016

(65) Prior Publication Data
US 2016/0274840 A1 Sep. 22, 2016

(30) Foreign Application Priority Data
Mar. 17, 2015 (JP) .................................. 2015-053361

(51) Int. Cl.
G06F 3/12 (2006.01)
G06F 21/60 (2013.01)

(52) U.S. Cl.
CPC .......... *G06F 3/1238* (2013.01); *G06F 3/1222* (2013.01); *G06F 3/1285* (2013.01); *G06F 3/1292* (2013.01); *G06F 21/608* (2013.01)

(58) Field of Classification Search
USPC ........................................................ 358/1.14
See application file for complete search history.

(56) References Cited

U.S. PATENT DOCUMENTS 5,828,322 A * 10/1998 Eberhard ............... G07C 5/008
235/384
2005/0105129 A1* 5/2005 Takahashi .......... H04N 1/00204
358/1.15

FOREIGN PATENT DOCUMENTS

| JP | 2001-125646 | 5/2001 |
| JP | 2001-195215 | 7/2001 |
| JP | 2006-321583 | 11/2006 |

OTHER PUBLICATIONS

Yamada Masaaki, Image Forming Device and Mobile Finisher, Nov. 30, 2006, Machine Translated Japanese Patent Application Publication listed on IDS, 2006-321583, All Pages.*

(Continued)

*Primary Examiner* — Ngon Nguyen
(74) *Attorney, Agent, or Firm* — Cooper & Dunham LLP

(57) ABSTRACT

A printed matter delivery system, in which a printed matter delivery apparatus delivers printed matter having an image formed by an image forming apparatus is provided. The system includes a print management unit managing a print job performed by the image forming apparatus; a delivery management unit managing a delivery job performed by the printed matter delivery apparatus; a delivery authentication processing unit performing a matching confirmation process to determine whether authentication information of the delivery job matches authentication information of the print job; a print controlling unit causing the image forming (Continued)

apparatus to generate the printed matter based on the print job authenticated by the delivery authentication processing unit and to output the printed matter to the printed matter delivery apparatus; and a receipt confirmation unit obtaining receipt information input into the printed matter delivery apparatus at a delivery destination.

12 Claims, 13 Drawing Sheets

(56) References Cited

OTHER PUBLICATIONS

Yamada Masaaki, Image Forming Device and Mobile Finisher, Nov. 30, 2006, Machine Translated Japanese Patent Application Publication listed on IDS, JP2006321583, All Pages.*

Nagaso Tadashi; Print Network System, Jul. 19, 2001, Machine Translated Japanese Patent Application Publication listed n IDS, JP2001195215, All Pages.*

* cited by examiner

FIG.12

| PRINT JOB ID | GROUP ID | JOB NAME | AUTHENTICATION INFORMATION | PRINT DATA |
|---|---|---|---|---|
| P0001 | G0001 | *** PRINT | XYZ1005 | ***.pdf |
| P0002 | G0002 | *** PRINT | XHD5371 | ***.word |
| P0003 | G0003 | *** PRINT | SKR1573 | ***.ppt |

FIG.13

| DELIVERY JOB ID | PRINT JOB ID | GROUP ID | JOB NAME | AUTHENTICATION INFORMATION | IMAGE FORMING DEVICE ID | POSITIONAL INFORMATION ABOUT IMAGE FORMING DEVICE | POSITIONAL INFORMATION ABOUT DELIVERY DESTINATION | RECEIPT INFORMATION |
|---|---|---|---|---|---|---|---|---|
| D0001 | P0001 | G0001 | DELIVER TO ** | XYZ1005 | MF102 | MAP COORDINATES | MAP COORDINATES | XYZ1005 |
| D0002 | P0002 | G0002 | DELIVER TO ** | XHD5371 | MF102 | MAP COORDINATES | MAP COORDINATES | KSH2014 |
| D0003 | P0003 | G0003 | DELIVER TO ** | SKR1573 | MF101 | MAP COORDINATES | MAP COORDINATES | NOT YET |

PRINTED MATTER DELIVERY SYSTEM, IMAGE FORMING APPARATUS, AND PRINTED MATTER DELIVERY APPARATUS

BACKGROUND OF THE INVENTION

1. Field of the Invention

The present invention relates to a printed matter delivery system, an image forming apparatus, and a printed matter delivery apparatus.

2. Description of the Related Art

In an office where an image forming device, such as a printer, is shared by a plurality of users, there are printed matter delivery devices that deliver, to one of the users seated away from the image forming device, printed matter output by the image forming device in accordance with a print request by the user.

For example, there are movable printers that deliver printed matter to a user in which an image is formed in accordance with a print request from the user and there are wheeled finishers that receive printed matter output from an image forming device and deliver the printed matter to a user (see Patent Document 1 or 2).

In the above printed matter delivery devices, management of security of the printed matter may be insufficient because the printed matter is output and delivery starts without performing authentication or the like directly by a user.

RELATED ART DOCUMENTS

[Patent Document 1] Japanese Laid-Open Patent Application No. 2001-125646 [Patent Document 2] Japanese Laid-Open Patent Application No. 2006-321583

SUMMARY OF THE INVENTION

It is a general object of at least one embodiment of the present invention to provide a printed matter delivery system by which security of printed matter is improved.

In an embodiment, a printed matter delivery system, in which a printed matter delivery apparatus delivers printed matter, the printed matter having an image formed by an image forming apparatus, is provided. The printed matter delivery system includes a print management unit that manages a print job performed by the image forming apparatus; a delivery management unit that manages a delivery job performed by the printed matter delivery apparatus; a delivery authentication processing unit that performs, while the printed matter delivery apparatus is connected to the image forming apparatus, a matching confirmation process to determine whether authentication information of the delivery job obtained by the image forming apparatus from the printed matter delivery apparatus matches authentication information of the print job; a print controlling unit that causes the image forming apparatus to print on a recording medium to generate the printed matter based on the print job authenticated by the delivery authentication processing unit and further causes the image forming apparatus to output the printed matter to the printed matter delivery apparatus; and a receipt confirmation unit that obtains receipt information, the receipt information being input into the printed matter delivery apparatus at a delivery destination of the printed matter.

BRIEF DESCRIPTION OF THE DRAWINGS

Other objects and further features of embodiments will become apparent from the following detailed description when read in conjunction with the accompanying drawings, in which:

FIG. 12 is a diagram depicting print jobs according to the embodiment;

FIG. 13 is a diagram depicting delivery jobs according to the embodiment; and

DESCRIPTION OF THE PREFERRED EMBODIMENTS

Figure 1:
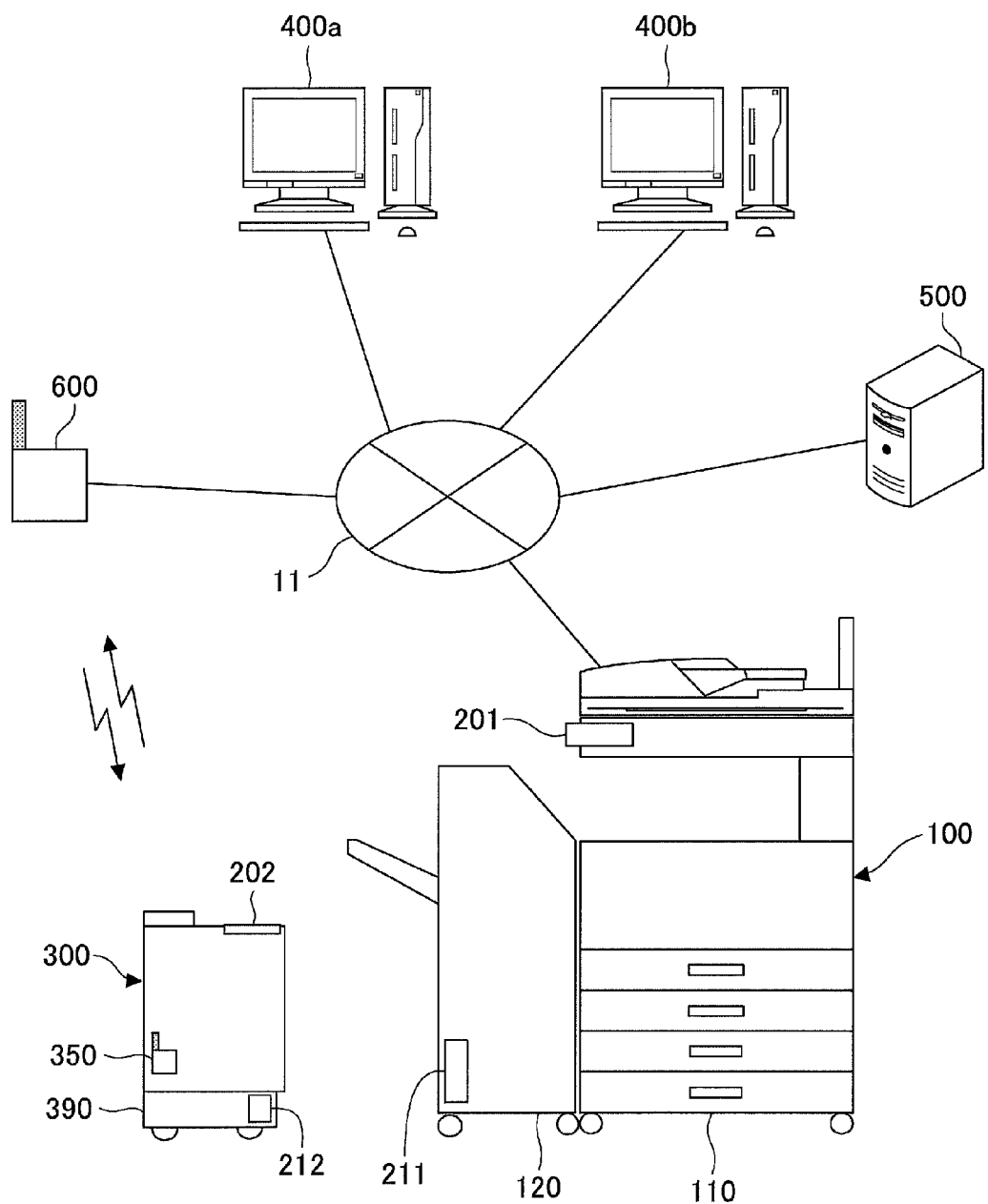
FIG. 1 is a schematic diagram depicting a configuration of a printed matter delivery system according to an embodiment.

In the following, an embodiment of the present invention will be described with reference to the drawings. In the drawings, the same reference numeral may be given to the same constituent elements to omit repetitive description.

<Configuration of Printed Matter Delivery System>

FIG. 1 is a schematic diagram depicting a configuration of a printed matter delivery system 10 according to the embodiment.

As shown in FIG. 1, the printed matter delivery system 10 includes an image forming device 100, a delivery device 300 as an example of a printed matter delivery device, user terminals 400a, 400b, a management device 500, and a wireless terminal 600, all of which are connected to a network 11 in a wired or wireless manner.

The image forming device 100 includes a device body 110 and a finisher 120. The device body 110 forms an image on a recording medium in response to a print job transmitted from the management device 500, for example. The device body 110 forms the image on the recording medium in an electrophotographic method, for example. In addition, the method for forming the image may be a different method such as an inkjet recording method.

The finisher 120 performs a post process such as sorting or stapling on the recording medium (hereafter "printed matter") on which the image is formed in the device body 110. While the image forming device 100 according to the present embodiment includes the finisher 120, the image forming device 100 may be configured without the finisher 120.

The image forming device 100 also includes a user authentication unit 201 and a print authentication unit 211.

The user authentication unit 201 is disposed on an upper part of the device body 110 and in proximity to an operation panel. For example, the user authentication unit 201 reads an IC card held by a user to obtain authentication information of the user and transmits the authentication information to the management device 500. In this case, the authentication information includes an identification number or the like assigned to each user, for example.

The print authentication unit 211 is an example of a delivery authentication unit and is disposed on a part of the finisher 120 to be connected to the delivery device 300. The print authentication unit 211 obtains authentication information included in a delivery job in the delivery device 300 from an IC card included in a delivery authentication unit 212 of the delivery device 300 and transmits the authentication information to the management device 500.

In addition, the user authentication unit 201 may receive input of authentication information on the operation panel from the user, for example. Further, the user authentication unit 201 may obtain the authentication information from the user in a different manner. Further, the print authentication unit 211 may obtain the authentication information from the delivery device 300 in a different manner such as infrared communication performed with the delivery authentication unit 212.

The delivery device 300 includes a communication unit 350 that can perform wireless communication with the wireless terminal 600 and a mobility unit 390 having a plurality of tires and a motor, for example. With the communication unit 350, the delivery device 300 transmits and receives various types of data to and from the management device 500 via the network 11 and the wireless terminal 600.

Based on a delivery job transmitted from the management device 500, the delivery device 300 connects to the finisher 120 of the image forming device 100 to receive printed matter and delivers the printed matter to a specified delivery destination. If the finisher 120 is not disposed on the image forming device 100, the delivery device 300 directly receives the printed matter from the device body 110.

With the mobility unit 390, the delivery device 300 autonomously moves along a delivery route to a delivery destination while avoiding obstructions, the delivery route being transmitted from the management device 500. When the delivery device 300 finishes delivering the printed matter, the delivery device 300 returns to a position (hereafter "home position") to connect to the finisher 120 again and waits in a state where the delivery device 300 can receive printed matter. A battery of the delivery device 300 is recharged in the home position.

The delivery device 300 also includes a receipt inputting unit 202 and the delivery authentication unit 212.

The receipt inputting unit 202 receives input of authentication information from a user that has received the printed matter from the delivery device 300, for example, and transmits the input authentication information to the management device 500. The receipt inputting unit 202 obtains the authentication information by reading an IC card of the user, for example. Further, the receipt inputting unit 202 includes an audio output unit, a display unit, and the like to request confirmation of receipt by the user at the delivery destination.

The delivery authentication unit 212 is an example of a delivery authentication unit and includes an IC card, for example. In the home position of the delivery device 300, the delivery authentication unit 212 allows the print authentication unit 211 of the image forming device 100 to read authentication information included in a delivery job. The image forming device 100 transmits the authentication information obtained by the print authentication unit 211 to the management device 500.

In addition, the receipt inputting unit 202 may obtain the authentication information of the user in a different manner such as reception of input of the authentication information of the user on an operation panel, for example. Further, the delivery authentication unit 212 may transmit the authentication information to the image forming device 100 in a different manner such as infrared communication performed with the print authentication unit 211.

The user terminals 400a, 400b include a Personal Computer (PC) operated by the user. The user terminal 400 may be a mobile information terminal such as a tablet terminal, a smartphone, or the like. The user operates the user terminal 400 to transmit a print request and a delivery request along with image data to the management device 500.

The management device 500 includes a PC, a workstation, or the like. The management device 500 creates and manages a print job and a delivery job based on the print request and the delivery request transmitted from the user terminal 400. The management device 500 transmits the print job to the image forming device 100 and transmits the delivery job to the delivery device 300 via the wireless terminal 600.

The wireless terminal 600 is connected to the network 11 and communicates with the communication unit 350 of the delivery device 300. The delivery device 300 and the management device 500 transmit and receive various types of data including the delivery job and the like to and from each other via the wireless terminal 600.

The printed matter delivery system 10 has the above configuration. Based on the print request and the delivery request transmitted by the user from the user terminal 400, the image forming device 100 forms an image on a recording medium and the delivery device 300 delivers printed matter to the user.

In addition, in the printed matter delivery system 10, a plurality of image forming devices 100 and a plurality of delivery devices 300 may be disposed. Further, the number of user terminals 400 connected to the network 11 may be one or three or more.

<Configuration of Delivery Device>

Figure 2:
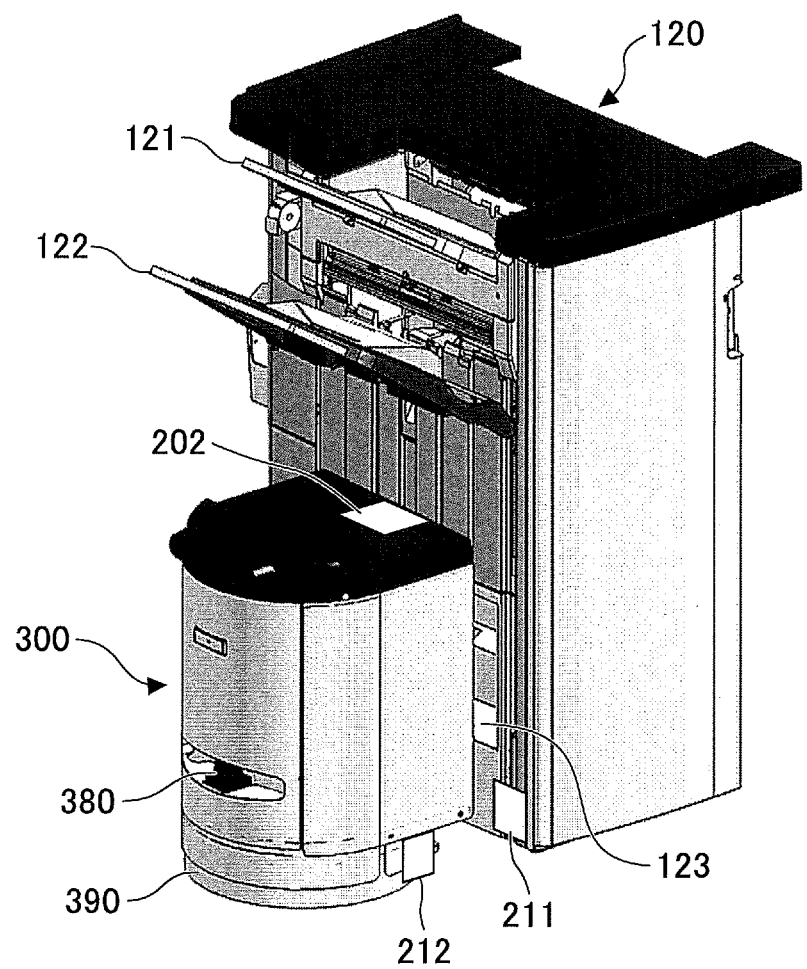
FIG. 2 is a diagram depicting a configuration of a finisher and a delivery device according to the embodiment.

FIG. 2 is a diagram depicting configurations of the finisher 120 and the delivery device 300 according to the embodiment.

The finisher 120 includes the print authentication unit 211, paper ejection trays 121, 122, and an outlet 123. In response to an instruction from the user, the finisher 120 performs sorting, stapling, or the like on printed matter output from the image forming device 100.

The print authentication unit 211 is disposed on a side to which the delivery device 300 is connected. A sorted or stapled printed matter is ejected to the paper ejection trays 121, 122. The outlet 123 ejects printed matter output from the image forming device 100 and hands the printed matter to the delivery device 300.

The user can select whether the printed matter output from the image forming device 100 is ejected to the paper ejection trays 121, 122 of the finisher 120 or the printed matter is delivered to a user's desk by the delivery device 300.

The delivery device 300 includes the receipt inputting unit 202, the delivery authentication unit 212, an obstruction detection sensor 380, and the mobility unit 390.

The receipt inputting unit 202 is disposed on a top surface of the delivery device 300. The delivery authentication unit 212 is disposed at a position that faces the print authentication unit 211 of the finisher 120 in the home position.

The obstruction detection sensor 380 detects obstructions and the like in front of the delivery device 300 (the opposite side of the finisher 120 in FIG. 2). The mobility unit 390 includes a plurality of tires, a motor, and the like and is disposed on a lower part of the delivery device 300. The mobility unit 390 can move in a given direction.

The delivery device 300 receives printed matter ejected from the outlet 123 of the finisher 120, moves along a delivery route transmitted by the management device 500, and delivers the printed matter to the user while avoiding obstructions and the like detected by the obstruction detection sensor 380.

In the following description, a side of the delivery device 300 on which the obstruction detection sensor 380 is located may be referred to as the front, the front face, or the front direction and a side of the delivery device 300 that connects to the finisher 120 may be referred to as the rear, the rear face, or the rear direction.

Figure 3B:
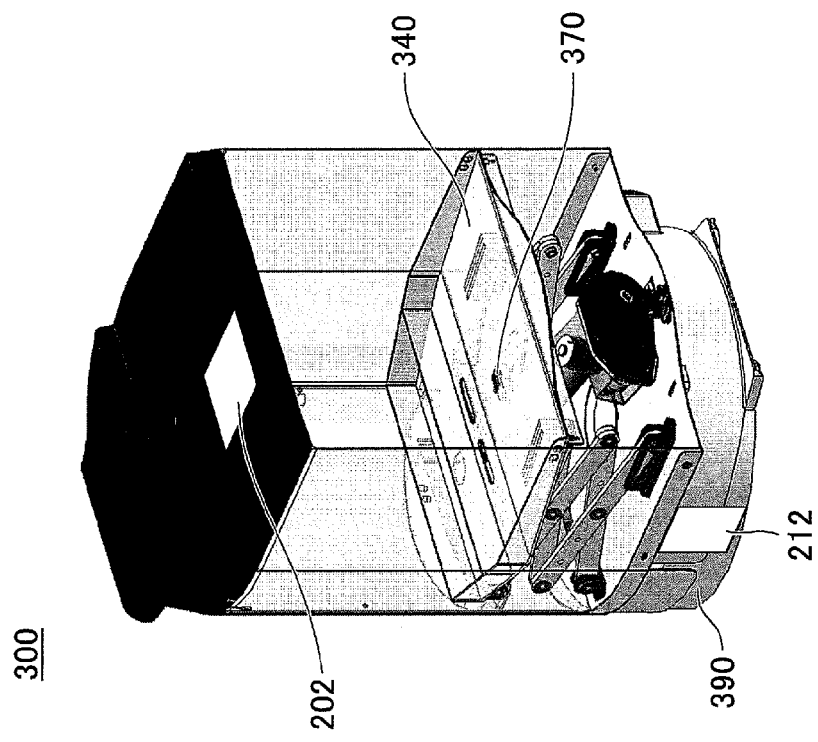
FIG. 3B is a perspective view depicting a delivery device according to the embodiment.
Figure 3A:
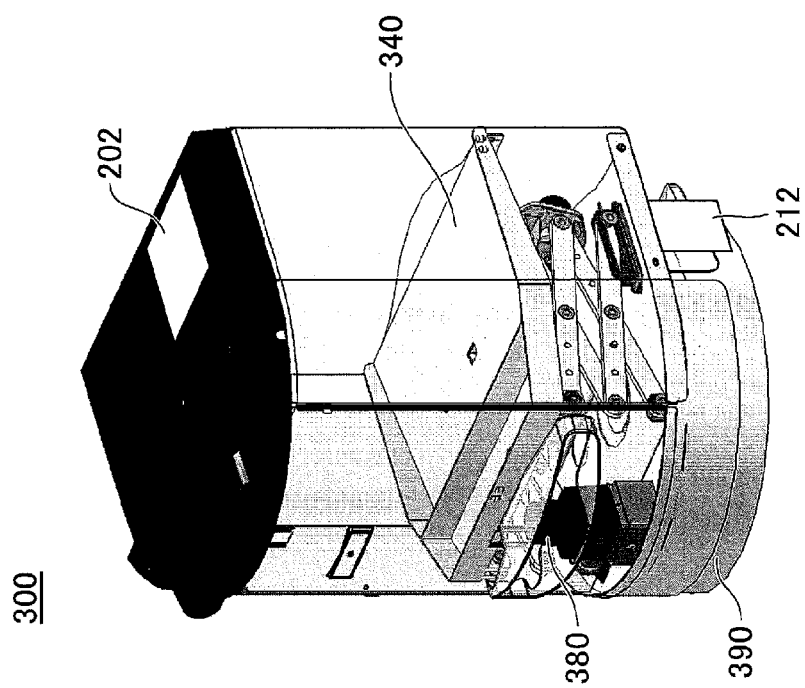
FIG. 3A is a perspective view depicting a delivery device according to the embodiment.

FIGS. 3A and 3B are perspective views depicting the delivery device 300 according to the embodiment. FIG. 3A is a perspective view from the front face of the delivery device 300. FIG. 3B is a perspective view from the rear face of the delivery device 300.

As shown in FIGS. 3A and 3B, on the delivery device 300, the receipt inputting unit 202 is disposed on the top surface, the obstruction detection sensor 380 is disposed on the front face, and the mobility unit 390 and the delivery authentication unit 212 are disposed on the lower part. The delivery device 300 also has an opening on the rear face to be connected to the finisher 120 and an elevating tray 340 that receives printed matter ejected from the finisher 120 is disposed within the delivery device 300.

On the elevating tray 340, a printed matter detecting sensor 370 is disposed at a center of a top surface thereof as shown in FIG. 3B. The printed matter detecting sensor 370 detects presence or absence of printed matter placed on the elevating tray 340.

In the following, operations of each unit of the delivery device 300 will be described.

(Obstruction Detection Sensor)

The obstruction detection sensor 380 is disposed on the front of the delivery device 300 and detects a distance to obstructions such as office furniture including a wall, a desk, a chair, and a shelf. The obstruction detection sensor 380 includes a ranging device such as a laser range finder. The obstruction detection sensor 380 projects a laser light, receives a reflected light, and measures a distance to a reflection point based on a phase difference between the projected laser light and the received laser light.

Figure 4B:
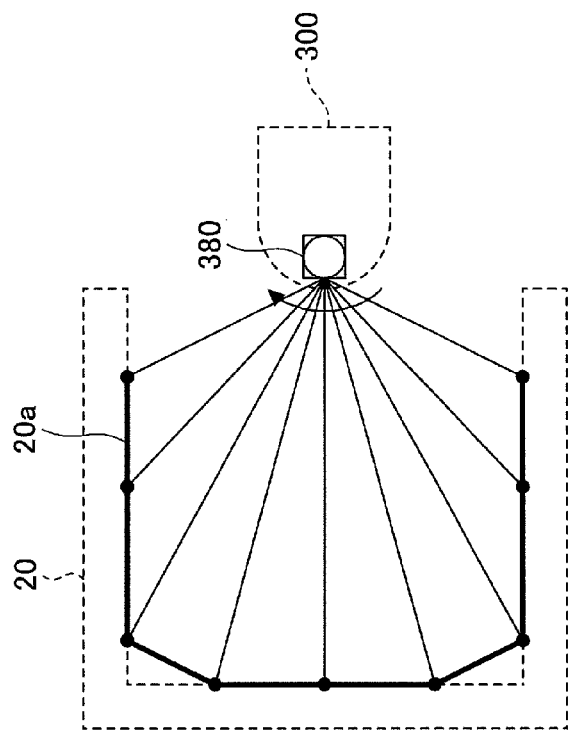
FIG. 4B is a diagram depicting an obstruction detection sensor detecting a wall according to the embodiment.
Figure 4A:
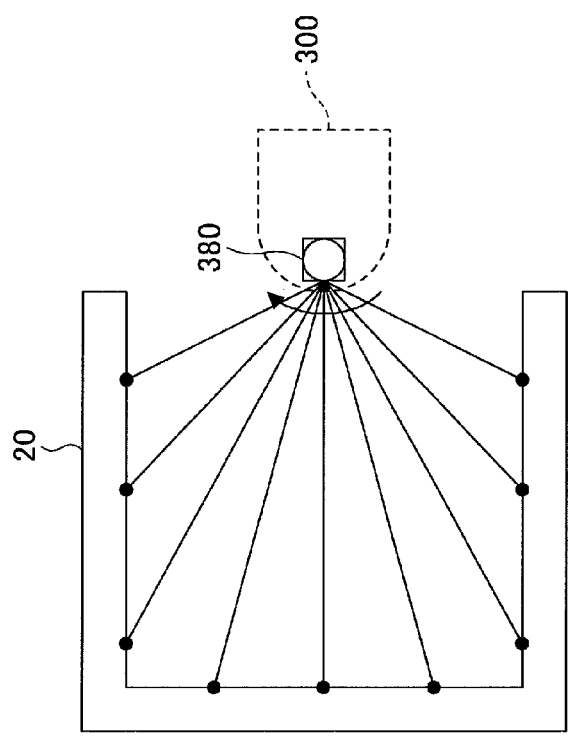
FIG. 4A is a diagram depicting an obstruction detection sensor detecting a wall according to the embodiment.

FIGS. 4A and 4B are diagrams depicting the obstruction detection sensor 380 detecting a wall 20 according to the embodiment.

As shown in FIG. 4A, the obstruction detection sensor 380 projects a laser light at predetermined angular intervals while rotating, for example, and measures a distance to a position on which the laser light is projected (indicated by dots in FIG. 4A). The obstruction detection sensor 380 can determine a shape of the wall 20 present in front of the delivery device 300 based on a measurement result of each rotation position.

FIG. 4B is a diagram depicting a detection result 20a of the wall 20 by the obstruction detection sensor 380 according to the embodiment. As shown in FIG. 4B, the obstruction detection sensor 380 can detect the wall 20 present in front of the delivery device 300. In the example shown in FIG. 4B, the wall 20 and the detection result 20a are slightly different. However, by reducing the angular intervals for measurement by the obstruction detection sensor 380, it is possible to detect the shape and the position of an object such as the wall 20 with improved precision.

(Mobility Unit)

The delivery device 300 controls the mobility unit 390 to move along a delivery route to a specified delivery destination.

Figure 5:
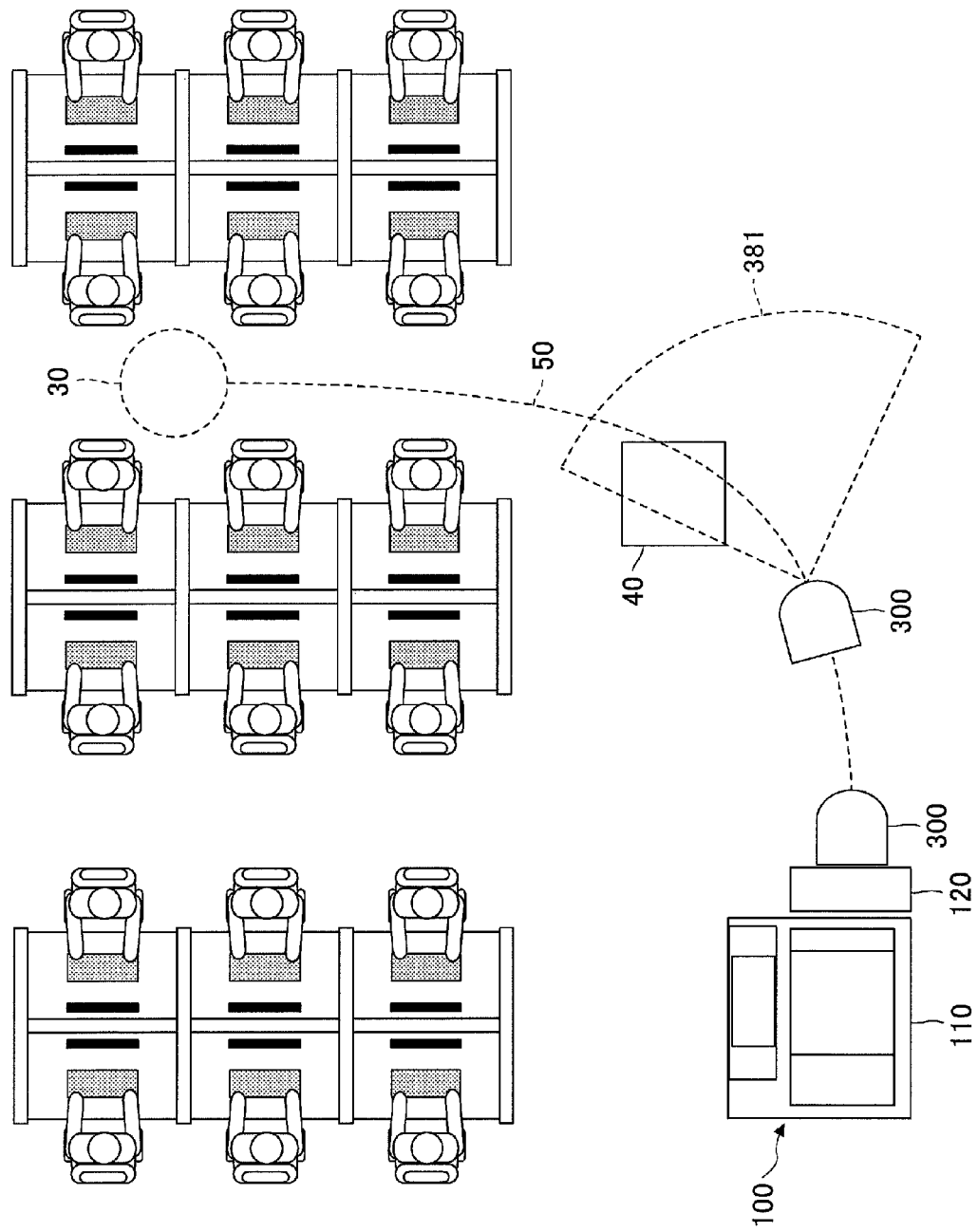
FIG. 5 is a diagram depicting a delivery device delivering printed matter along a delivery route according to the embodiment.

When the delivery device 300 receives printed matter in the home position from the finisher 120 as shown in FIG. 5, the mobility unit 390 starts moving along a delivery route 50 that has been set. While the delivery device 300 is moving, the obstruction detection sensor 380 projects a laser light while rotating and detects presence or absence of an obstruction in a detection field 381 in front of the delivery device 300.

Figure 6:
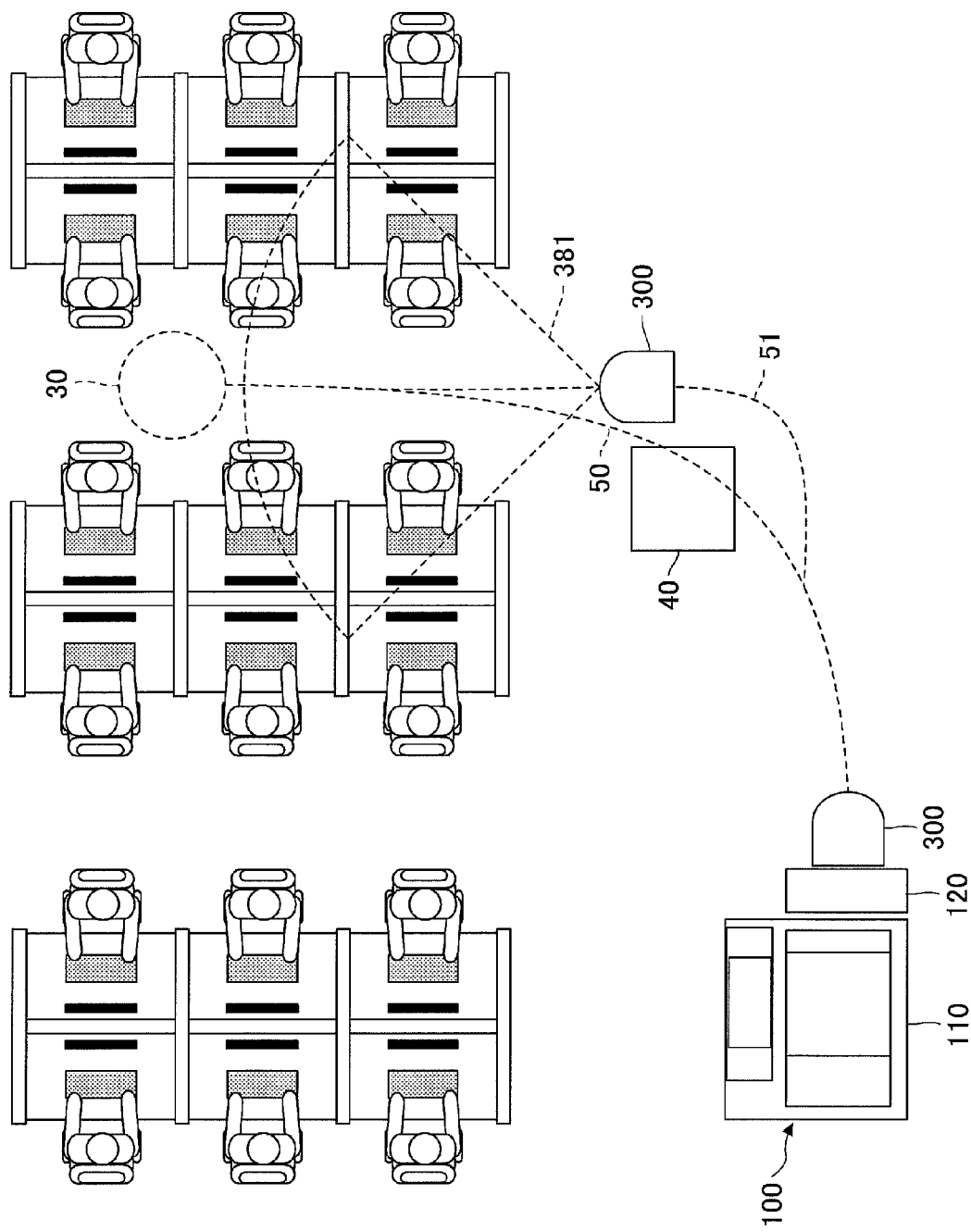
FIG. 6 is a diagram depicting a delivery device delivering printed matter while avoiding obstructions according to the embodiment.

For example, if the obstruction detection sensor 380 detects an obstruction 40 present on the delivery route 50 as shown in FIG. 5, the delivery device 300 sets a new delivery route 51 to avoid the obstruction 40 as shown in FIG. 6. By moving along the newly set delivery route 51, the delivery device 300 avoids the obstruction 40 and delivers printed matter to a delivery destination 30.

In this manner, with the obstruction detection sensor 380, the delivery device 300 detects the obstruction 40 in front and the mobility unit 390 autonomously moves while avoiding the obstruction 40 so as to deliver the printed matter to the delivery destination 30.

(Elevating Tray)

Figure 7B:
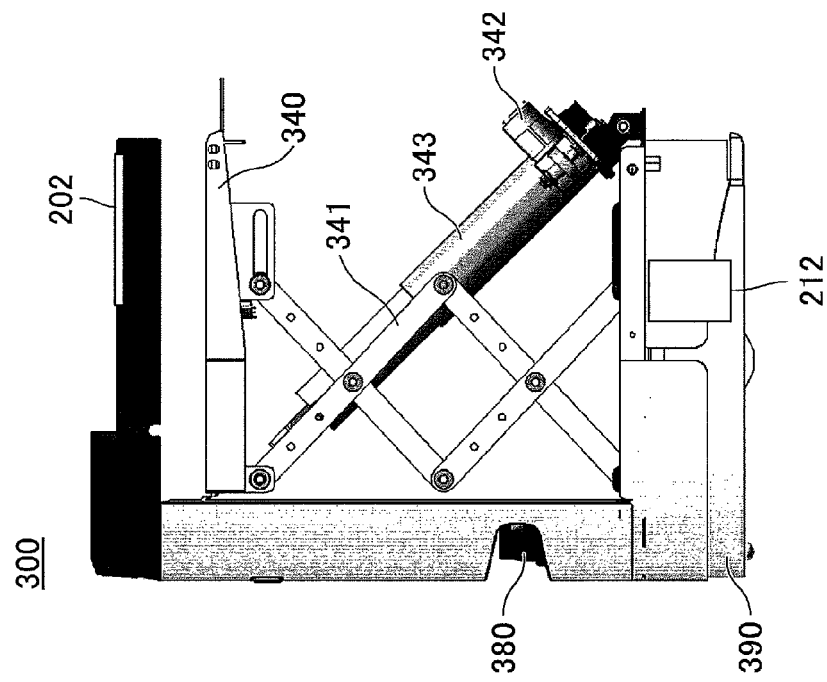
FIG. 7B is a diagram depicting an elevation operation of an elevating tray according to the embodiment.
Figure 7A:
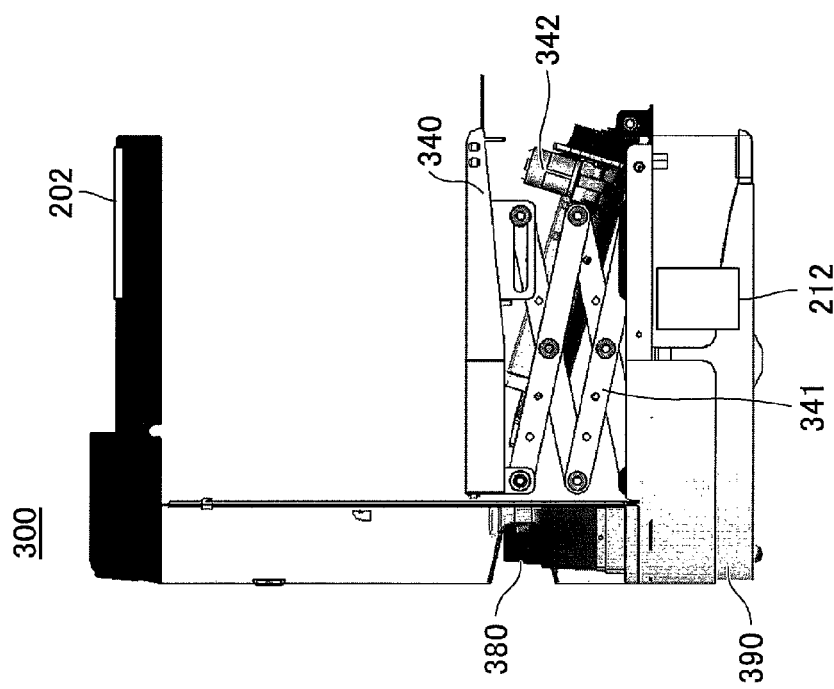
FIG. 7A is a diagram depicting an elevation operation of an elevating tray according to the embodiment.

FIGS. 7A and 7B are diagrams depicting an elevation operation of the elevating tray 340 according to the embodiment.

As shown in FIGS. 7A and 7B, the elevating tray 340 is disposed to be able to ascend or descend within the delivery device 300 by an elevating mechanism that includes an elevation link 341, an elevation motor 342, and a shaft 343.

The elevation link 341 is a multi-joint link that supports the elevating tray 340 and extends or retracts in a vertical direction in FIGS. 7A and 7B. The elevation motor 342 rotates to extend or retract the shaft 343 connected thereto via a ball screw, for example. The shaft 343 extends or retracts in accordance with driving of the elevation motor 342 and lifts or lowers the elevating tray 340.

In a lowered state as shown in FIG. 7A, the elevating tray 340 receives printed matter ejected by the finisher 120. When the printed matter is handed to the user, the elevating tray 340 ascends and stops at a predetermined height by the elevating mechanism as shown in FIG. 7B such that the user readily takes out the printed matter.

Preferably, a plurality of speeds can be selected by the user for an elevating speed of the elevating tray 340. Depending on a usage environment, it is possible to slow down the elevating speed to reduce noise if quietness is required, for example.

<Hardware Configuration of Each Device>

(Image Forming Device)

Figure 8:
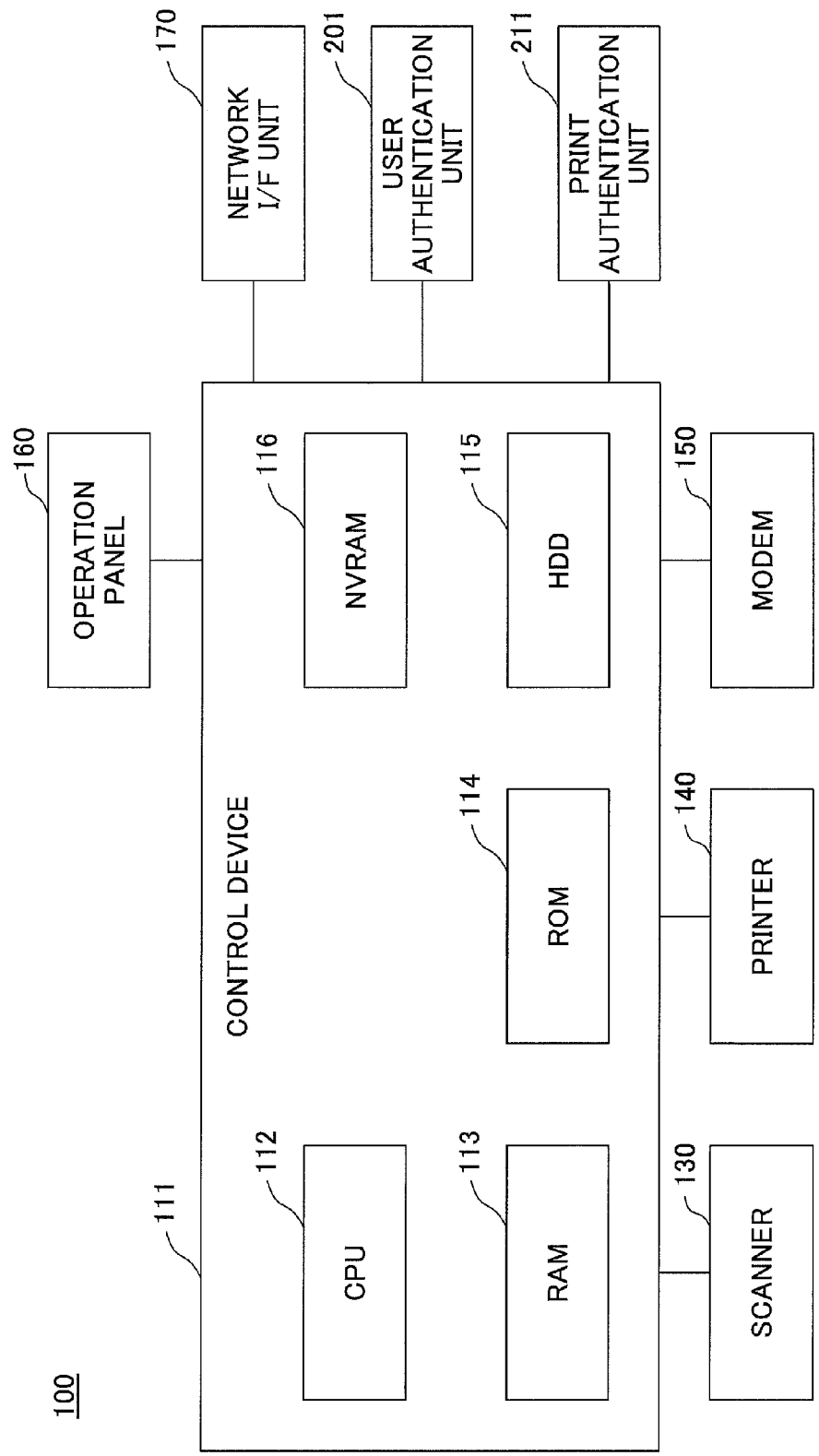
FIG. 8 is a diagram of a hardware configuration of an image forming device according to the embodiment.

FIG. 8 is a diagram of a hardware configuration of the image forming device 100 according to the embodiment.

As shown in FIG. 8, the image forming device 100 includes hardware such as a control device 111, a scanner 130, a printer 140, a modem 150, an operation panel 160, a network I/F unit 170, the user authentication unit 201, and the print authentication unit 211.

The control device 111 includes a CPU 112, a RAM 113, a ROM 114, a HDD 115, an NVRAM 116, and the like. The ROM 114 stores various programs and data used by the programs, and the like. The RAM 113 is used as a storage area to load the program or a work area of the loaded program, for example.

The CPU 112 implements various functions by processing the program loaded in the RAM 113. The HDD 115 stores programs and various types of data used by the programs. The NVRAM 116 stores various types of setting information and the like.

The scanner 130 includes hardware to read image data from a document. The printer 140 includes hardware to print an image on paper as a recording medium. The modem 150 includes hardware to connect to a telephone circuit and is used to transmit or receive image data through FAX communication.

The operation panel 160 includes hardware having an input unit such as a button to receive input from the user and a liquid crystal panel or the like provided with a touch panel function. The network I/F unit 170 includes hardware to connect to a network (wired or wireless) such as a LAN.

The user authentication unit 201 includes hardware to read an IC card owned by the user, obtain authentication information, and transmit the authentication information to the management device 500, for example. The print authentication unit 211 includes hardware to obtain authentication information included in a delivery job in the delivery device 300 from an IC card disposed on the delivery authentication unit 212 of the delivery device 300 and to transmit the authentication information to the management device 500.

(Delivery Device)

Figure 9:
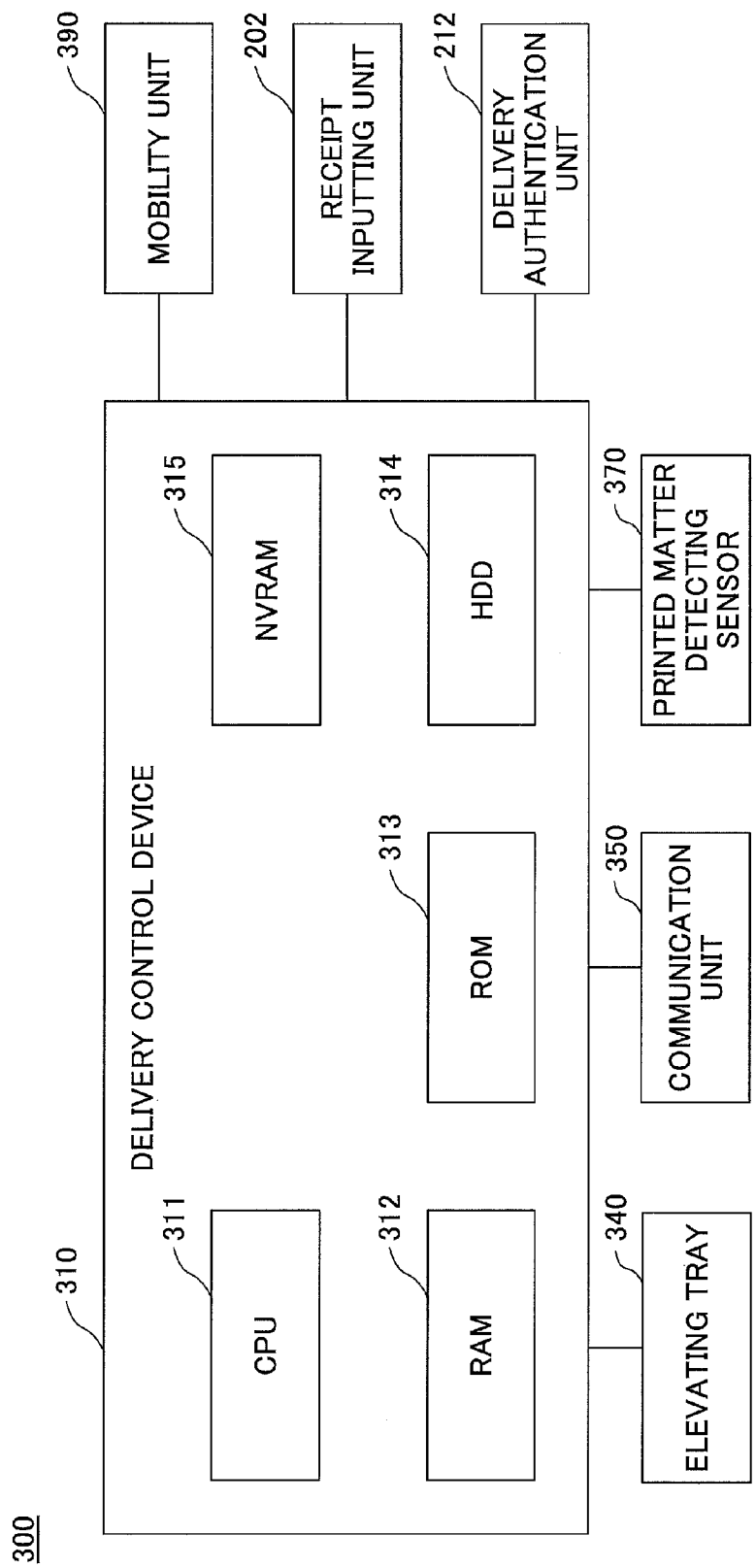
FIG. 9 is a diagram of a hardware configuration of a delivery device according to the embodiment.

FIG. 9 is a diagram of a hardware configuration of the delivery device 300 according to the embodiment.

As shown in FIG. 9, the delivery device 300 includes hardware such as a delivery control device 310, the elevating tray 340, the communication unit 350, the printed matter detecting sensor 370, the mobility unit 390, the receipt inputting unit 202, and the delivery authentication unit 212.

The delivery control device 310 includes a CPU 311, a RAM 312, a ROM 313, a HDD 314, an NVRAM 315, and the like. The ROM 313 stores various programs and data used by the programs, and the like. The RAM 312 is used as a storage area to load the program or a work area of the loaded program, for example.

The CPU 311 implements various functions by processing the program loaded in the RAM 312. The HDD 314 stores programs and various types of data used by the programs. The NVRAM 315 stores various types of setting information and the like.

The elevating tray 340 receives printed matter ejected from the finisher 120 and ascends or descends during delivery, for example.

The communication unit 350 includes hardware to wirelessly communicate with the wireless terminal 600 or the like. The printed matter detecting sensor 370 includes an optical sensor to detect printed matter placed on the elevating tray 340. The printed matter detecting sensor 370 may include a different sensor such as a weight sensor as long as the printed matter placed on the elevating tray 340 is detected.

The obstruction detection sensor 380 includes a ranging device such as a laser range finder as mentioned above and includes hardware to detect obstructions in front of the delivery device 300. In addition, instead of the obstruction detection sensor 380, the delivery device 300 may include a detection unit that detects obstructions and the like based on a stereo camera method for measuring a distance to an object using two cameras or a projection method for determining a position of the object by projecting various patterns.

The mobility unit 390 is disposed on the lower part of the delivery device 300 and includes a plurality of tires, a motor connected to the tires via a driving mechanism, and the like. The mobility unit 390 is controlled to move along a delivery route to be set.

The receipt inputting unit 202 includes hardware to read an IC card owned by the user and obtain authentication information of the user, for example. The delivery authentication unit 212 includes hardware to allow the print authentication unit 211 of the image forming device 100 to read authentication information in the home position of the delivery device 300, the authentication information being included in a delivery job.

(Management Device)

Figure 10:
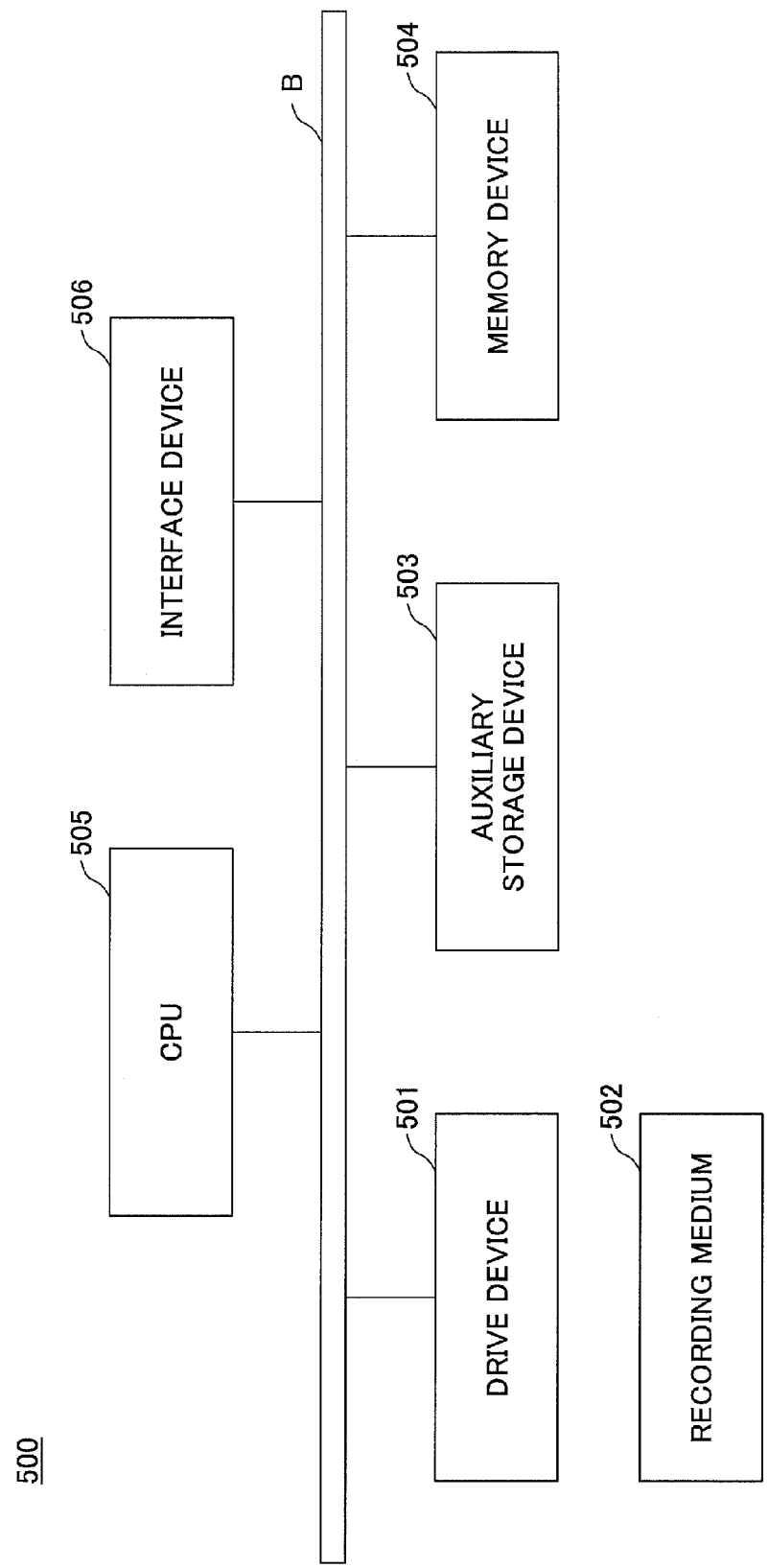
FIG. 10 is a diagram of a hardware configuration of a management device according to the embodiment.

FIG. 10 is a diagram of a hardware configuration of the management device 500 according to the embodiment.

As shown in FIG. 10, the management device 500 includes a drive device 501, an auxiliary storage device 503, a memory device 504, a CPU 505, an interface device 506, and the like, all of which are interconnected via a bus B.

A program to implement a process in the management device 500 is provided by a recording medium 502 such as a CD-ROM. When the recording medium 502 in which the program is stored is set in the drive device 501, the program is installed in the auxiliary storage device 503 from the recording medium 502 via the drive device 501.

However, the program need not be installed from the recording medium 502 but may be downloaded from another computer via the network 11. The auxiliary storage device 503 stores the installed program and also stores necessary files or data.

The memory device 504 reads and stores the program from the auxiliary storage device 503 if there is an instruction to start the program. The CPU 505 performs functions of the management device 500 in accordance with the program stored in the memory device 504. The interface device 506 is used as an interface to connect to the network 11.

In addition, the management device 500 may be a computer system including a plurality of computers.

<Functional Configuration of Printed Matter Delivery System>

Figure 11:
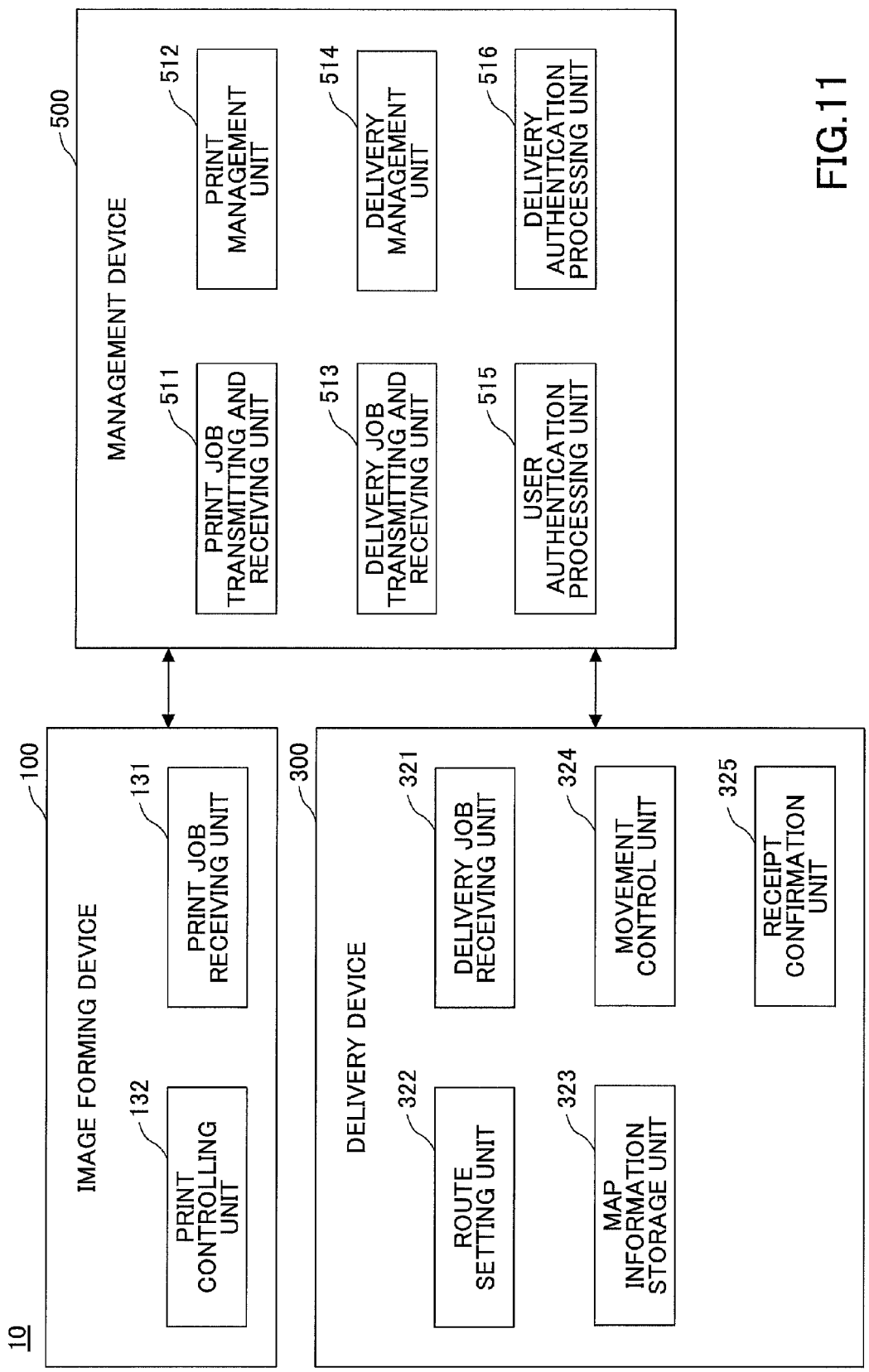
FIG. 11 is a diagram of a functional configuration of a printed matter delivery system according to the embodiment.

FIG. 11 is a diagram of a functional configuration of the printed matter delivery system 10 according to the embodiment.

The image forming device 100 includes a print job receiving unit 131 and a print controlling unit 132. The print job receiving unit 131 is an example of a print job receiving unit and receives a print job from the management device 500. The print controlling unit 132 is an example of a print controlling unit and controls the printer 140 to print an image on a recording medium based on the print job received by the print job receiving unit 131.

The delivery device 300 includes a delivery job receiving unit 321, a route setting unit 322, a map information storage unit 323, a movement control unit 324, and a receipt confirmation unit 325.

The delivery job receiving unit 321 is an example of a delivery job receiving unit and receives a delivery job from the management device 500. The route setting unit 322 sets a delivery route based on a delivery destination included in the delivery job and map information stored in the map information storage unit 323, the map information indicating an arrangement of desks or chairs in an office, for example. If the obstruction detection sensor 380 detects an obstruction, the route setting unit 322 sets a delivery route again such that movement is possible while avoiding the obstruction.

The map information storage unit 323 stores the map information indicative of the arrangement of desks or chairs in the office, for example. The movement control unit 324 is an example of a movement control unit and controls the mobility unit 390 to move along the delivery route set by the route setting unit 322.

The receipt confirmation unit 325 is an example of a receipt confirmation unit. If authentication information of the user is input into the receipt inputting unit 202 by the user at the delivery destination and printed matter is handed over, the receipt confirmation unit 325 transmits the authentication information of the user that has received the printed matter to the management device 500. The receipt confirmation unit 325 determines whether the printed matter is handed over to the user based on a detection result of the printed matter detecting sensor 370.

The management device 500 includes a print job transmitting and receiving unit 511, a print management unit 512, a delivery job transmitting and receiving unit 513, a delivery management unit 514, a user authentication processing unit 515, and a delivery authentication processing unit 516.

The print job transmitting and receiving unit 511 receives a print request transmitted by the user terminal 400. Further, the print job transmitting and receiving unit 511 transmits a print job managed by the print management unit 512 to the image forming device 100.

The print management unit 512 is an example of a print management unit. The print management unit 512 creates and manages a print job based on the print request received by the print job transmitting and receiving unit 511. FIG. 12 is a diagram depicting print jobs according to the embodiment.

The print management unit 512 creates print jobs including a "print job ID," a "group ID," a "job name," "authentication information," "print data," and the like as shown in FIG. 12 based on the print request transmitted by the user terminal 400. The print management unit 512 transmits the print jobs to the image forming device 100 via the print job transmitting and receiving unit 511 and performs the print jobs in order.

The "print job ID" included in the print job includes a number or the like assigned in order of the transmission of the print request by the user. The "group ID" includes group information indicating a relationship between the print job and a delivery job. The "job name" includes a name of the print job automatically assigned based on contents of printing or the like performed in the image forming device 100. The "authentication information" includes authentication information of the user that has transmitted the print request. The authentication information may be an identification number or the like of the user, for example. The "print data" includes a file name of image data transmitted from the user to be printed on a recording medium.

The delivery job transmitting and receiving unit 513 receives a delivery request transmitted by the user terminal 400. The delivery job transmitting and receiving unit 513 also transmits a delivery job managed by the delivery management unit 514 to the delivery device 300.

The delivery management unit 514 is an example of the delivery management unit. The delivery management unit 514 creates and manages a delivery job based on the delivery request received by the delivery job transmitting and receiving unit 513. FIG. 13 is a diagram depicting delivery jobs according to the embodiment.

The delivery management unit 514 creates delivery jobs including a "delivery job ID," a "print job ID," a "group ID," a "job name," "authentication information," an "image forming device ID," "positional information about image forming device," "positional information about delivery destination," "receipt information," and the like as shown in FIG. 13 based on the delivery request transmitted by the user terminal 400. The delivery management unit 514 transmits the delivery jobs to the delivery device 300 via the delivery job transmitting and receiving unit 513 and performs the delivery jobs in order.

The "delivery job ID" included in the delivery job includes a number or the like assigned in order of the transmission of the delivery request by the user. The "print job ID" corresponds to the delivery job. The "group ID" includes group information indicating the relationship between the print job and the delivery job. The "job name" includes a name of the delivery job automatically assigned including a user's name as a delivery destination, for example. The "authentication information" includes authentication information of the user that has transmitted the delivery request. The authentication information may be an identification number or the like of the user, for example.

The "image forming device ID" includes an ID of the image forming device 100 from which printed matter is received in the delivery job. The "positional information about image forming device" includes information such as map coordinates indicative of the position of the image forming device 100 from which the printed matter is received. The "positional information about delivery destination" includes information such as map coordinates indicative of the position of a desk or a chair of the user that has transmitted the delivery request. And the "receipt information" includes authentication information of the user that receives the printed matter from the delivery device 300. The receipt information may be an identification number or the like of the user, for example.

Because the print management unit 512 and the delivery management unit 514 assign a common group ID to a relevant print job and a relevant delivery job, it is possible to associate the print job with the delivery job and appropriately control a job state. Further, when the group ID is assigned, operation or searching for job data by the user is easy.

The user authentication processing unit 515 is an example of an user authentication processing unit. When the user inputs authentication information to the user authentication unit 201 of the image forming device 100 using an IC card or the like, the user authentication processing unit 515 performs a process to authenticate the user. The user authentication processing unit 515 performs a matching confirmation process to determine whether the authentication information of the user obtained by the user authentication unit 201 matches authentication information included in the print job being performed in the image forming device 100. The delivery authentication processing unit 516 is an example of a delivery authentication processing unit. The delivery authentication processing unit 516 performs a matching confirmation process to determine whether authentication information of the delivery job obtained by the print authentication unit 211 of the image forming device 100 from the delivery authentication unit 212 of the delivery device 300 matches the authentication information included in the print job in the image forming device 100.

The management device 500 may be configured with a plurality of devices including a print management device having the print job transmitting and receiving unit 511 and the print management unit 512 and a delivery management device having the delivery job transmitting and receiving unit 513 and the delivery management unit 514, for example.

Further, one or more functions of the management device 500 may be disposed on the image forming device 100 or the delivery device 300, for example. One or more functions of the route setting unit 322, the map information storage unit 323, and the movement control unit 324 included in the delivery device 300 may be disposed on the image forming device 100 or the management device 500, for example.

<Printed Matter Delivery Process>

Figure 14:
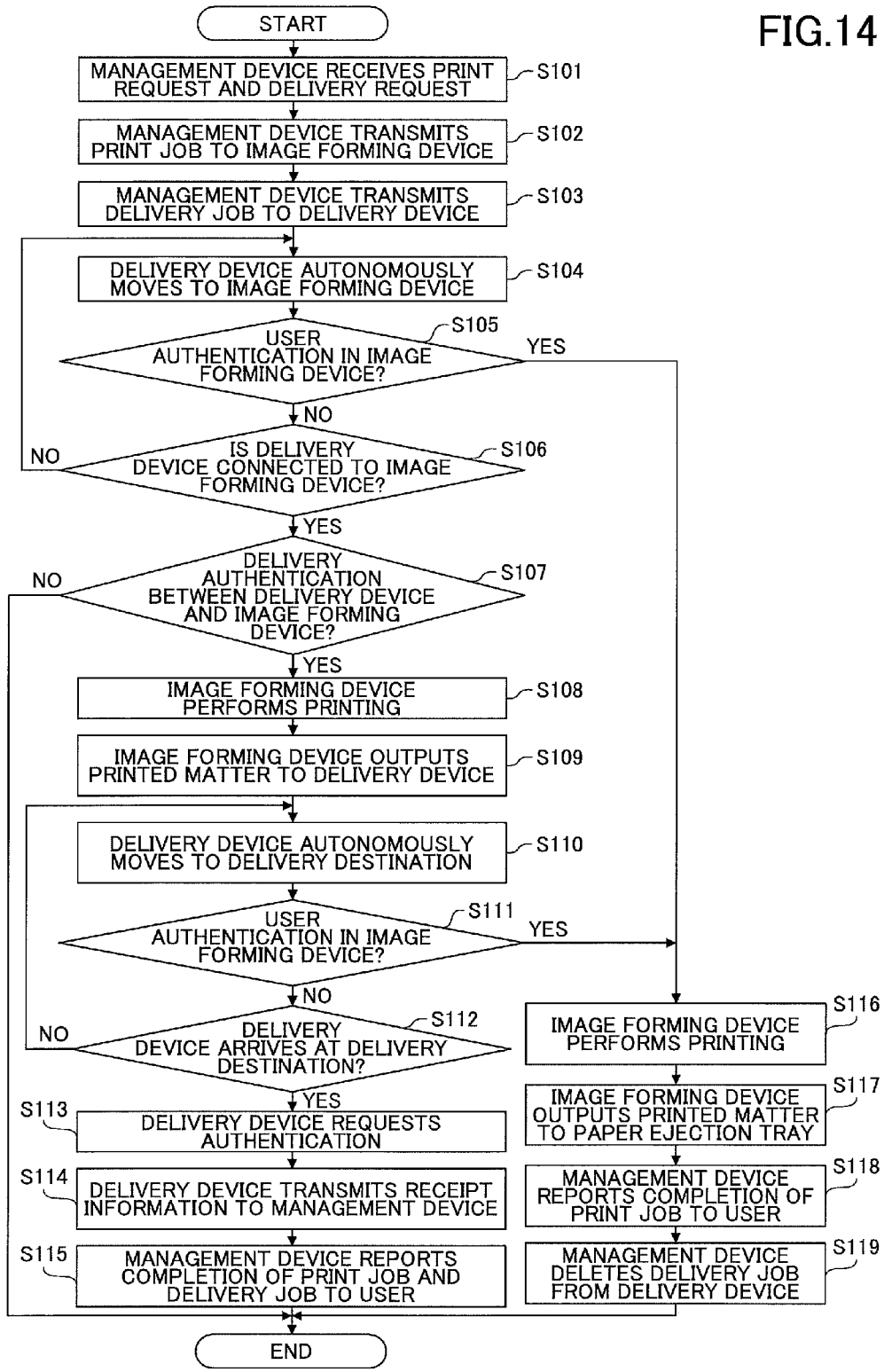
FIG. 14 is a flowchart of a printed matter delivery process according to the embodiment.

In the following, a printed matter delivery process in the printed matter delivery system 10 is described. FIG. 14 is a flowchart of the printed matter delivery process according to the embodiment.

As shown in FIG. 14, in step S101, the management device 500 receives a print request and a delivery request transmitted from the user terminal 400 operated by the user. Specifically, the print job transmitting and receiving unit 511 receives the print request and the delivery job transmitting and receiving unit 513 receives the delivery request.

In step S102, the print management unit 512 creates a print job based on the print request, stores the created print job, and transmits the created print job to the image forming device 100. In step S103, the delivery management unit 514 creates a delivery job based on the delivery request, stores the created delivery job, and transmits the created delivery job to the delivery device 300.

In step S104, the movement control unit 324 controls the mobility unit 390 such that the delivery device 300 autonomously moves toward the image forming device 100. A route to the image forming device 100 is set by the route setting unit 322 based on positional information about image forming device or the like included in the delivery job received by the delivery job receiving unit 321.

In step S105, if the user inputs authentication information to the user authentication unit 201 of the image forming device 100, the user authentication processing unit 515 determines whether the input authentication information is authenticated as authentication information of the print job in the image forming device 100.

If the input authentication information is authenticated by the user authentication processing unit 515 (step S105: YES), printed matter is output from the image forming device 100 in a process from step S116, so that the user can receive the printed matter.

In this manner, while the delivery device 300 moves toward the image forming device 100, if the user urgently needs the printed matter, for example, the user can input the authentication information to the user authentication unit 201 at the image forming device 100 and directly receive the printed matter from the image forming device 100.

If the user does not input the authentication information to the user authentication unit 201 of the image forming device 100 (step S105: NO), in step S106, the movement control unit 324 determines whether the delivery device 300 has arrived at the home position and is connected to the image forming device 100.

If the delivery device 300 has not arrived at the home position (step S106: NO), the process returns to step S104 and the delivery device 300 continues to autonomously move toward the image forming device 100.

If the delivery device 300 has arrived at the home position (step S106: YES), in step S107, the delivery authentication processing unit 516 performs a matching confirmation process to determine whether the image forming device 100 matches the delivery device 300.

When the delivery device 300 is connected to the image forming device 100, the delivery authentication unit 212 of the delivery device 300 allows the print authentication unit 211 of the image forming device 100 to read authentication information included in the delivery job in the delivery device 300. The delivery authentication processing unit 516 performs a matching confirmation process to determine whether the authentication information of the delivery job read by the print authentication unit 211 matches authentication information of the print job in the image forming device 100.

If the read authentication information is not authenticated by the delivery authentication processing unit 516 (step S107: NO), the management device 500 reports that printing and delivery cannot be carried out to the user terminal 400 and the process ends.

If the read authentication information is authenticated by the delivery authentication processing unit 516 (step S107: YES), in step S108, the print controlling unit 132 of the image forming device 100 causes the printer 140 to print image data in the print job. Next, in step S109, the print controlling unit 132 controls the finisher 120 to output printed matter to the delivery device 300.

In step S110, the route setting unit 322 of the delivery device 300 sets a delivery route based on positional information about delivery destination or the like included in the delivery job and the movement control unit 324 controls the mobility unit 390 to move along the delivery route.

In step S111, if the user inputs the authentication information to the user authentication unit 201 of the image forming device 100, the user authentication processing unit 515 determines whether the input authentication information is authenticated as the authentication information of the print job in the image forming device 100.

If the input authentication information is authenticated by the user authentication processing unit 515 (step S111: YES), printed matter is output from the image forming device 100 in the process from step S116, so that the user can receive the printed matter.

In this manner, while the delivery device 300 moves toward the user as a delivery destination, if the user urgently needs the printed matter, for example, the user can input the authentication information to the user authentication unit 201 of the image forming device 100 and directly receive the printed matter from the image forming device 100.

Further, other than urgent cases, the user can also directly receive the printed matter from the image forming device 100 if the delivery device 300 takes time for delivery in order to detour around an obstruction or if failure occurs in the delivery device 300, for example.

If the user does not input the authentication information to the user authentication unit 201 of the image forming device 100 (step S111: NO), in step S112, the movement control unit 324 determines whether the delivery device 300 has arrived at the delivery destination.

If the delivery device 300 has not arrived at the delivery destination (step S112: NO), the process returns to step S110 and the delivery device 300 continues to autonomously move toward the delivery destination.

If the delivery device 300 has arrived at the delivery destination (step S112: YES), in step S113, the receipt confirmation unit 325 of the delivery device 300 prompts the user to input the authentication information by causing the receipt inputting unit 202 to perform an audio output or an image display, for example.

The user inputs the authentication information to the receipt inputting unit 202 of the delivery device 300 in response to the authentication request and receives the printed matter from the delivery device 300. Further, if the user that has transmitted the print request and the delivery request is absent, a substitute user can input his/her own authentication information to the receipt inputting unit 202 and receive the printed matter.

When the authentication information is input into the receipt inputting unit 202 and the printed matter is handed over, in step S144, the receipt confirmation unit 325 of the delivery device 300 transmits the input authentication information as receipt information to the management device 500. In the management device 500, the delivery management unit 514 inputs the transmitted authentication information to the receipt information of the delivery job. By inputting the authentication information of the user that has received the printed matter to the receipt information of the delivery job, it is possible to manage the user that received the printed matter (the user that transmitted the delivery request or the substitute user, for example).

In step S115, the print management unit 512 of the management device 500 transmits a report of completion of the print job from the print job transmitting and receiving unit 511 to the user terminal 400. Further, the delivery management unit 514 transmits a report of completion of the delivery job from the delivery job transmitting and receiving unit 513 to the user terminal 400, thereby ending the process.

Further, as described above, in the printed matter delivery system 10, before the delivery device 300 delivers the printed matter to the user, the user can receive the printed matter from the image forming device 100 by inputting the authentication information to the user authentication unit 201 at the image forming device 100.

For example, while the delivery device 300 is moving, if the authentication information is input into the user authentication unit 201 of the image forming device 100 and the input authentication information is authenticated as the authentication information of the print job (step S105 or Sill: YES), the process from step S116 is performed.

In step S116, the print job that corresponds to the authentication information input into the user authentication unit 201 is displayed on the operation panel 160. The print job selected by the user is performed by the print controlling unit 132. Next, in step S117, the print controlling unit 132 controls the finisher 120 to output printed matter to one of the paper ejection trays 121, 122.

In step S118, the print management unit 512 of the management device 500 transmits a report of completion of the print job from the print job transmitting and receiving unit 511 to the user terminal 400. Further, in step S119, the delivery management unit 514 transmits an instruction to delete the delivery job from the delivery job transmitting and receiving unit 513 to the delivery device 300 to delete the delivery job, thereby ending the process.

As described above, in the printed matter delivery system 10 according to the present embodiment, the output of printed matter in the image forming device 100 is performed if authentication information read from the delivery device 300 or authentication information input by the user corresponds to authentication information of a print job. Accordingly, because the printed matter is delivered to the user by the delivery device 300 or directly handed over to the user, security of the printed matter is improved and output management of printed matter becomes easy.

Further, in the printed matter delivery system 10, the user can directly receive printed matter output in the image forming device 100 in an urgent case or if failure occurs in the delivery device 300 and delivery is delayed, for example. In this case, the user can cause the image forming device 100 to output the printed matter by only causing the image forming device 100 to read an IC card or the like without transmitting a print request to the image forming device 100 again. In this manner, the printed matter delivery system 10 can directly hand over the printed matter to the user with an easy operation and is superior in convenience.

Although the printed matter delivery system, the image forming device, and the printed matter delivery device according to the embodiment are described above, the present invention is not limited to the above embodiment. Various modifications and improvements are possible within the scope of the present invention.

According to the embodiment of the present invention, a printed matter delivery system is provided, in which security of printed matter is improved.

Further, the present invention is not limited to these embodiments, and various variations and modifications may be made without departing from the scope of the present invention.

The present application is based on and claims the benefit of priority of Japanese Priority Application No. 2015-053361 filed on Mar. 17, 2015, the entire contents of which are hereby incorporated by reference.

What is claimed is:

1. A printed matter delivery system, in which a printed matter delivery apparatus delivers printed matter, the printed matter having an image formed by an image forming apparatus, the printed matter delivery system comprising:
a management device that (i) creates a print job based on a print request received from a user and transmits the print job to the image forming apparatus, and (ii) creates, based on a delivery request received from the user, a delivery job including group information associating the print job and the delivery job with each other, and transmits the delivery job to the printed matter delivery apparatus;
a delivery authentication processing unit included in the management device that performs, while the printed matter delivery apparatus is connected to the image forming apparatus, a delivery authentication process to determine whether authentication information obtained by the image forming apparatus in connection with the delivery job while the printed matter delivery apparatus is connected to the image forming apparatus matches authentication information obtained in connection with the print job which is associated with the delivery job; and
a print controlling unit that causes the image forming apparatus to print on a recording medium to generate the printed matter based on the print job authenticated by the delivery authentication processing unit and further causes the image forming apparatus to output the printed matter to the printed matter delivery apparatus.

2. The printed matter delivery system as claimed in claim 1, further comprising:

a user authentication processing unit that performs a matching confirmation process to determine whether user authentication information input into the image forming apparatus by a user matches the authentication information of the print job, wherein if the user authentication information is input into the image forming apparatus before the delivery job from the printed matter delivery apparatus arrives at the delivery destination, the print controlling unit causes the image forming apparatus to generate the printed matter based on the print job authenticated by the user authentication processing unit.

3. The printed matter delivery system as claimed in claim 1, wherein each of the print job and the delivery job includes the group information that indicates that the print job is associated with the delivery job.

4. The printed matter delivery system as claimed in claim 1, wherein the image forming apparatus acquires the authentication information of the delivery job from the printed matter delivery apparatus, and sends the authentication information of the delivery job to the management device.

5. The printed matter delivery system as claimed in claim 1, further comprising:
a receipt confirmation unit that obtains receipt information input by the user via the printed matter delivery apparatus at a delivery destination of the printed matter.

6. An image forming apparatus for outputting printed matter to a printed matter delivery device, the image forming apparatus comprising:
a print job receiving unit that receives a print job from a management device that created the print job based on a print request received from a user; and
a delivery authentication unit that obtains, while the printed matter delivery device is connected to the image forming apparatus, authentication information of a delivery job from the printed matter delivery device, the printed matter delivery device having received the delivery job from the management device which created the delivery job based on a delivery request received from the user, the delivery job including group information that associates the print job and the delivery job with each other,
wherein a delivery authentication processing unit included in the management device performs, while the printed matter delivery apparatus is connected to the image forming apparatus, a delivery authentication process to determine whether the authentication information obtained by the delivery authentication unit in connection with the delivery job matches authentication information of the print job which is associated with the delivery job; and
a print controlling unit that performs a print process on a recording medium to generate the printed matter based on the print job authenticated by the delivery authentication processing unit and outputs the printed matter to the printed matter delivery device.

7. The image forming apparatus as claimed in claim 6, further comprising:
a user authentication processing unit that performs a matching confirmation process to determine whether user authentication information input into the image forming apparatus by a user matches the authentication information of the print job, wherein if the user authentication info nation is input into the image forming apparatus before the delivery job from the printed matter delivery device arrives at the delivery destination, the print controlling unit performs the print process to generate the printed matter based on the print job authenticated by the user authentication processing unit.

8. The image forming apparatus as claimed in claim 6, wherein each of the print job and the delivery job includes the group information that indicates that the print job is associated with the delivery job.

9. The image forming apparatus as claimed in claim 6, wherein the image forming apparatus acquires the authentication information of the delivery job from the printed matter delivery apparatus, and sends the authentication information of the delivery job to the management device.

10. A printed matter delivery apparatus for delivering printed matter having an image formed by an image forming device based on a print job received by the image forming device from a management device which created the print job based on a print request received from a user, the printed matter delivery apparatus comprising:
a delivery job receiving unit that receives a delivery job from the management device, the management device having created the delivery job based on a delivery request from a user, the delivery job including group information that associates the print job and the delivery job with each other; and
a delivery authentication unit that causes, while the printed matter delivery apparatus is connected to the image forming device, the image forming device to obtain authentication information of the delivery job, wherein
a delivery authentication processing unit included in the management device performs, while the printed matter delivery apparatus is connected to the image forming apparatus, a delivery authentication process to determine whether the authentication information obtained by the image forming apparatus in connection with the delivery job matches authentication information of the print job which is associated with the delivery job, and
the printed matter is output from the image forming device based on the print job authenticated by the delivery authentication processing unit.

11. The printed matter delivery apparatus as claimed in claim 10, further comprising:
a user authentication processing unit that performs a matching confirmation process to determine whether user authentication information input into the image forming device by a user matches the authentication information of the print job, wherein
if the user authentication information is input into the image forming device before the delivery job from the printed matter delivery apparatus arrives at the delivery destination, a print process is performed to generate the printed matter based on the print job authenticated by the user authentication processing unit.

12. The printed matter delivery apparatus as claimed in claim 10, wherein each of the print job and the delivery job includes the group information that indicates that the print job is associated with the delivery job.

* * * * *